Dec. 18, 1934.  E. S. BUSH  1,985,014

CONTROL FOR AUTOMOTIVE VEHICLES

Filed March 14, 1932  3 Sheets-Sheet 1

INVENTOR.
EUGENE S. BUSH
BY
ATTORNEYS

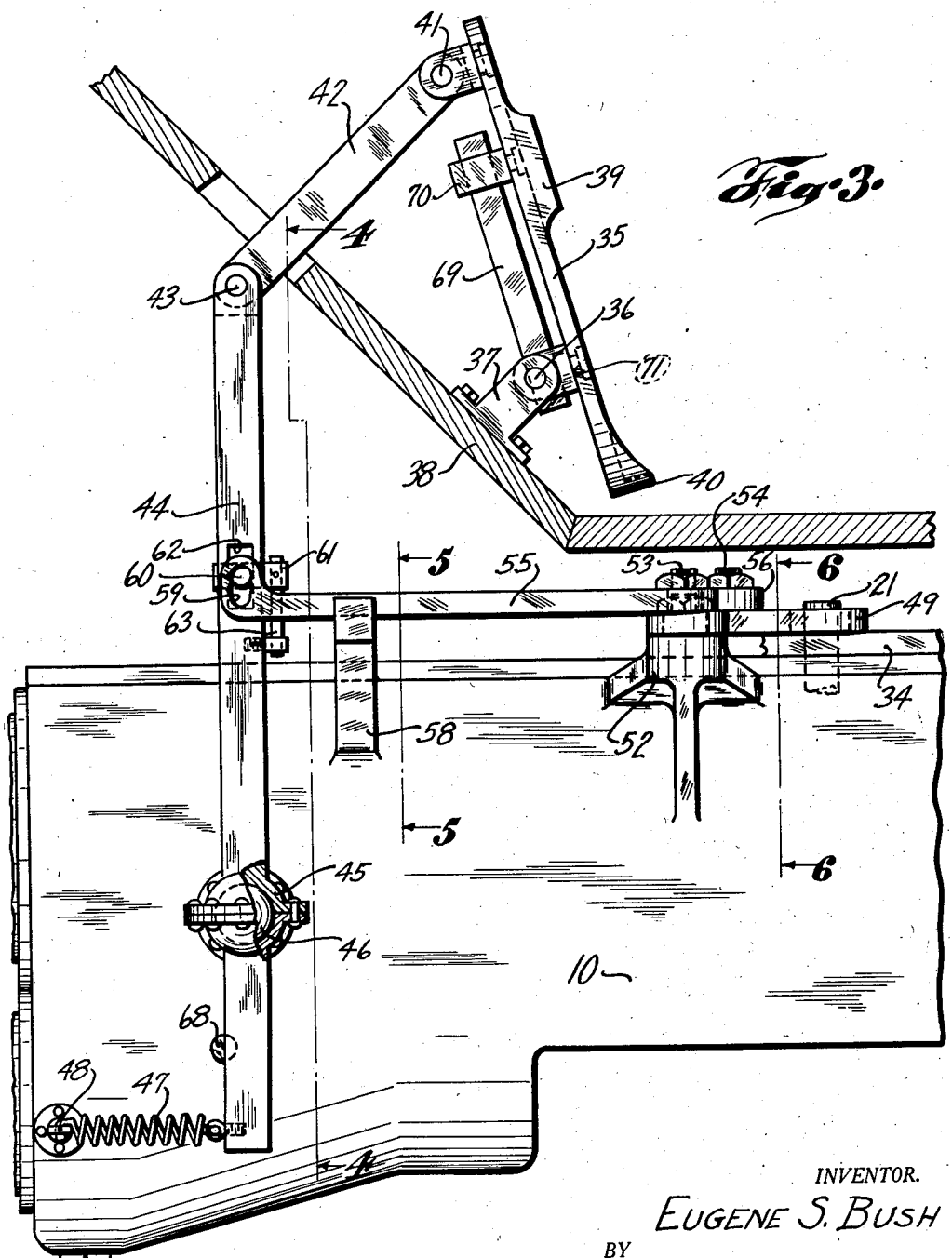

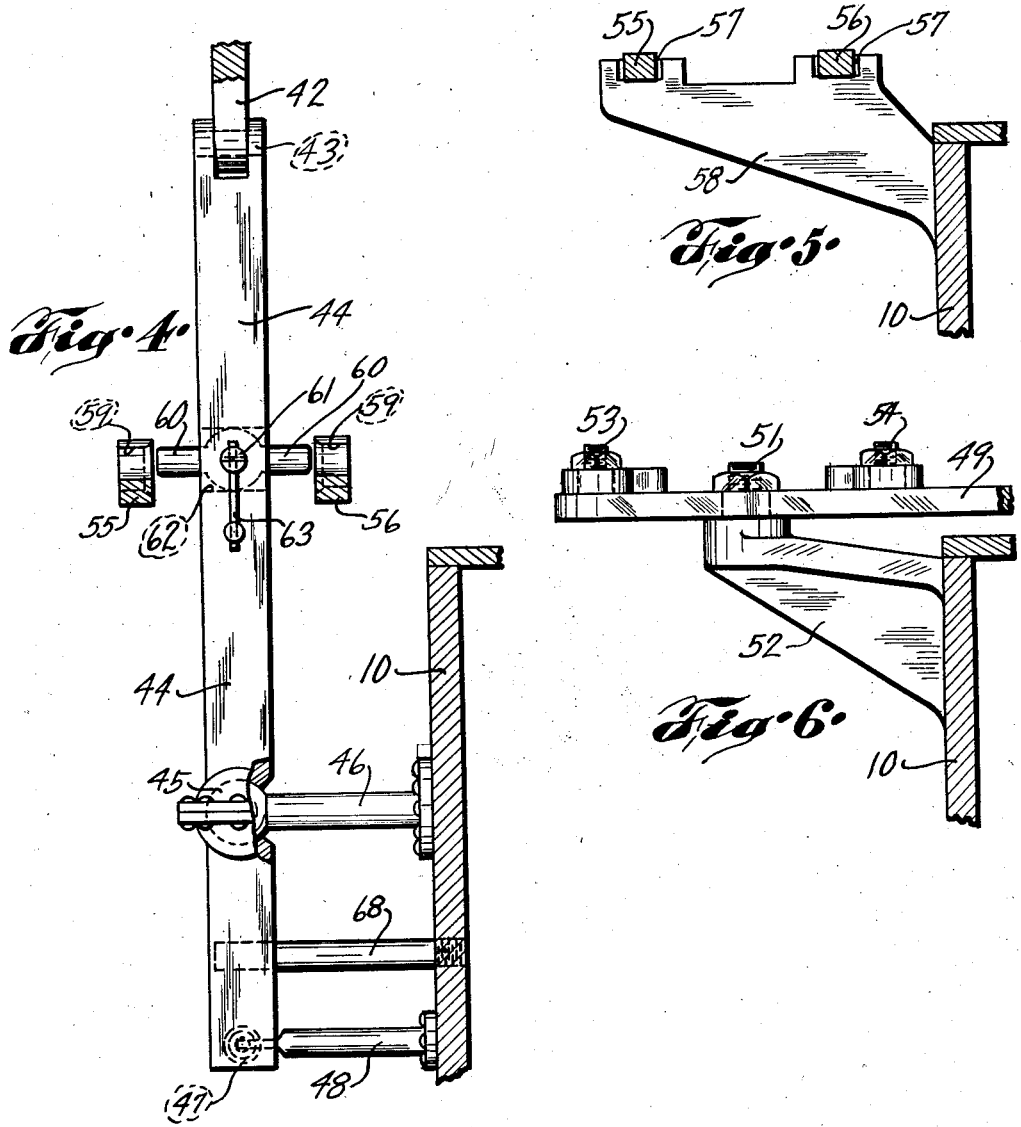

Patented Dec. 18, 1934

1,985,014

UNITED STATES PATENT OFFICE 1,985,014

CONTROL FOR AUTOMOTIVE VEHICLES

Eugene S. Bush, St. Louis, Mo., assignor to Bush Manufacturing Company, St. Louis, Mo., a corporation of Missouri Application March 14, 1932, Serial No. 598,758

13 Claims. (Cl. 192—.01)

This invention relates to improvements in controls for automotive vehicles, and more particularly to an improved foot control adapted to be employed for a unified, coordinated control actuation of a speed change transmission, a friction clutch and an engine throttle.

An object of the present invention is attained in the provision of a device such that speed change control movements, as in automotive practice, may be accomplished solely by the foot of the operator, leaving both hands available for steering, and thus conducing to a greater degree of safety than prevails according to the present usage, requiring one hand of the operator to manipulate a gear shift lever.

A further object of the invention is obtained in an arrangement of controls for automobiles, such that, instead of requiring separate manipulative controls such as a clutch pedal, a gear shift lever, an overrunning control and a foot throttle, such controls are all combined into a single control element such as a pedal, and the provision of control connections from such pedal so arranged that a sequence of speed-change and clutch-control movements occurs automatically as the foot control is actuated in a given direction.

Yet another object of the invention is attained in a simplified foot-controlled organization so designed that, except for the operations of steering and braking, all controls necessary to be manipulated during operation of the vehicle, are concentrated in a single foot control element.

A still further object of the invention is attained in improved foot-actuated facilities offering all of the utilities and advantages, in an automotive vehicle, of an over-running clutch, the present provisions in this connection consisting in the combination, with a clutch control assembly, of provisions for releasing the friction clutch, for free running, responsively to a small effortless movement of the pedal control therefor.

An additional object of the invention is attained in the provision of means for controlling, by a given unidirectional movement of a control lever, a speed change transmission, to effect selectively, either the forward speed or reverse placements of the control elements.

Figure 1:
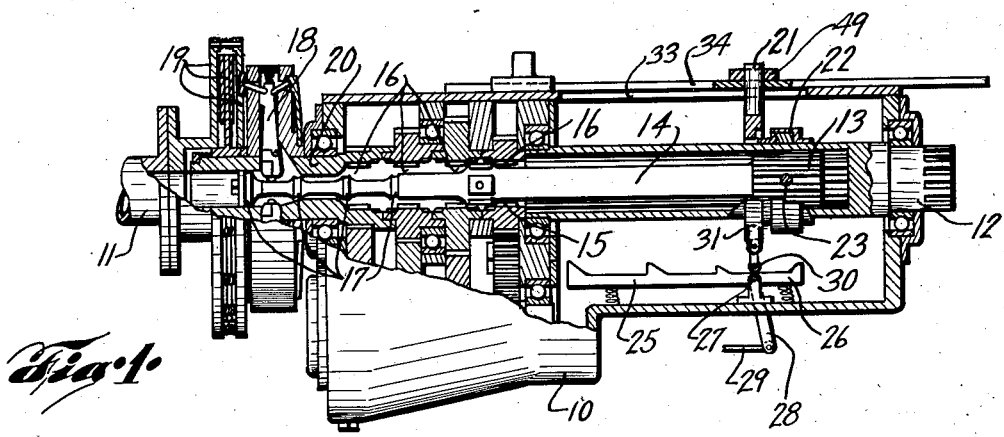
Figure 2:
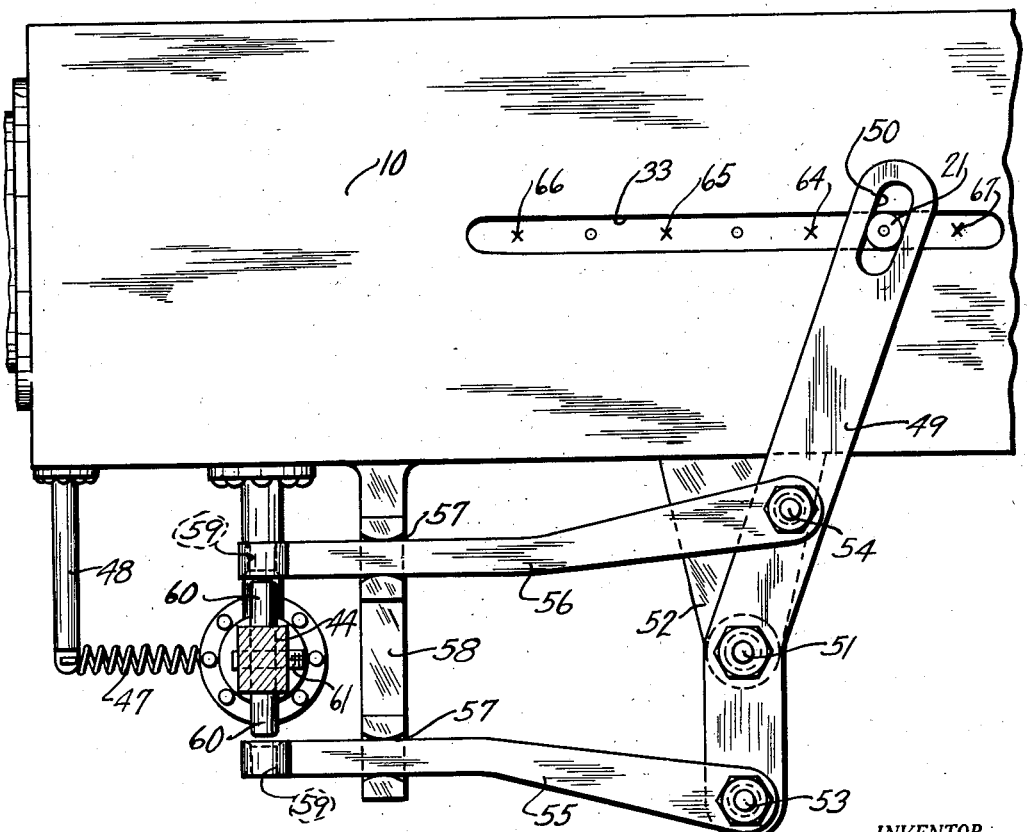

Further objects and advantages of the invention will appear as the description proceeds, and from the claims, as well as the drawings, forming a part of this specification, and in which:

Fig. 1 is a vertical sectional elevation of an improved type of transmission, for the control of which the present invention is particularly adapted; Fig. 2 is a plan view, showing certain parts in section, of connections between a foot pedal and the speed change transmission of Fig. 1; Fig. 3 is a vertical sectional elevation, further showing the relation of the control pedal to the transmission of Fig. 1 and the connections of Fig. 2; Fig. 4 is a vertical sectional elevation along the line 4—4 of Fig. 3; Fig. 5 is a vertical sectional elevation along line 5—5 of Fig. 3, and Fig. 6 is a sectional elevation as viewed along line 6—6 of Fig. 3.

The present embodiment of the invention illustrates it in a form adapted for the control of a transmission of the general type described in my copending application, filed February 11, 1931, and bearing Serial No. 514,953; certain details of structure of the arrangement appearing in Fig. 1 being more particularly set forth in a divisional application thereof, filed January 9, 1932, and bearing Serial No. 585,683. The details of construction of the transmission proper form no part of the present invention, other than as associated and combined with the foot control features hereof, the several features of the construction of the transmission and clutch assembly proper being incorporated herein, by reference to the aforesaid applications.

For purposes of a brief present description, it is seen that the transmission of Fig. 1 consists of a case 10; a driving shaft 11, connected say to the usual internal combustion engine, and a driven shaft 12 constituting, or connected to the propeller shaft of an automobile, for example. The shaft 12 is hollow in part, and internally splined, the splines therein being engaged by a correspondingly splined head 13, secured to or forming a part of an intermediate power shaft 14, provided with a driving head 15 characterized by a plurality of radial projections; the head 15 being adapted to be brought selectively within, and freely through central apertures 16, one in each of a plurality of the aligned gears employed for speed-change purposes in the transmission. The shaft 14 is also provided with spaced cam portions 17, adapted selectively for engagement with clutch-actuating plungers 18, the relation of parts being such that, as cams 17 are selectively brought into the plane of plungers 18, the resulting outward movement of the plungers causes the actuation of clutch elements 19, toward clutch-actuating position, three of such elements being illustrated. The spacing of clutch actuating cams 17 on shaft 14 corresponds to the spacing between centers of the central openings of the aligned gears of the gear train, the arrangement and spacing being further such that, as the shaft 14 is moved longitudinally, movement of the driving head 15 into engagement with pawls (not shown in detail) within each of the gear portions 16, serves first to effect, through the gear train, an operative connection of a hollow shaft 20, driven by the friction clutch, with a selected one of the aligned gears. This engaging connection is sequentially followed by coaction of one of the cams 17 with the plungers 18 in a manner to bring the friction clutch elements into engagement.

Shifting of shaft 14 and the parts carried thereby, is effected through an upstanding stud or projection 21, operatively associated (by means not shown in detail) with a shifting collar 22, connected as through a pin 23 to the shaft 14, the pin operating in longitudinal slots therefor in the hollow shaft 12.

Provision is made in the example described, for actuating the throttle of an engine with which the described transmission is associated, such provision including a pair of cams 25 and 26 independently carried by a pivot 27, each of the cams being characterized by spaced low portions and high portions, substantially as appears in Fig. 1. The cam members are fixedly secured to the pivot 27, which in turn is associated with a throttle actuating linkage 28, and thence connected to a throttle control rod 29.

The cams 25 and 26 are arranged to be selectively operated by one or more rollers 30, each in the nature of a cam follower carried by member 31, and arranged for selective movement responsively to shifting movement of the stud 21. The arrangement is, by preference, such that the collar 22 is moved a short distance, by stud 21, prior to the time when the element 31 is moved to actuate the cam follower roller 30 for effective control of the engine. This lost-motion arrangement is set out in detail in my copending application of Serial No. 591,590, filed February 8, 1932, to which reference is directed. It thus appears that movement of the stud 21, endwise of the transmission case 10, as through an elongate slot 33 in the top of the case, serves a three-fold purpose, viz., first, the selection of a transmission gear ratio; secondly, an appropriate sequential actuation of the friction clutch identified with elements 19, and thirdly, an ensuing acceleration of the engine through the coaction of a cam follower 30 and one of the cams 25 or 26, it further appearing that the several noted control operations take place in proper sequence.

For the purpose of preventing the escape of transmission lubricant out of the slot 33, a suitable slot closer element 34 is shown in section in Fig. 1, but omitted from Fig. 2 for clearness, this element having an opening to accommodate the stud 21 and being movable endwise, along the slot, as the stud is moved for purposes of control.

As thus far described, the transmission structure, the coordinated sequential control of gear ratio, clutch and throttle, form of themselves no part of the present invention but are described and claimed in detail in the above noted copending applications.

Proceeding now to a description of the structure by which the arrangement is adapted for control by the foot of the operator, it is seen, (Fig. 3) that a foot pedal 35 is mounted for depressible movement about a pivot 36 journalled in spaced bearing members 37 which may, in turn, be carried by a floor board or like structure 38 of an automotive vehicle. The pedal 35 is characterized by lateral projections 39, one preferably disposed at each side of the forward or outer portion of the pedal, and a heel rest 40. Pivotally secured near the forward extremity of pedal 35, as through pin 41, is a control link 42, pivotally connected as by pin 43, to an upper or outer, relatively long arm of a lever 44. This lever is provided near its opposite end with a socket 45, pivotally engaging a ball end of a bracket 46 secured, for example, to a side wall of the transmission case. The shorter arm of lever 44 is engaged by a tension spring 47, the opposite end of the spring being connected to any convenient stationary anchorage 48.

Functional connection between the lever 44 and the stud or arm 21, is effected through a linkage best appearing in Fig. 2. There is provided, for pivotal movement in a substantially horizontal plane, a lever 49, the arms of which are preferably angularly related as appears, the long arm of member 49 having a slotted inner extremity 50, the slot portion thereof extending over the member 21. Lever 49 is pivotally supported as by a pivot member 51, projecting from a bracket 52, (Fig. 6), supported, say from the side wall of the transmission case 10. It will appear that, as the lever 49 is swung about its vertical pivot 51, there will result a corresponding movement of stud 21, causing it to traverse the slot 33, according to the extent of movement of the lever 49.

Spaced at equal distances from the pivot 51, and on opposite sides thereof, are pivots 53 and 54, serving respectively as a connection to drag links 55 and 56 operating through guide channels 57 in a bracket 58, carried as by the wall of the transmission case. The corresponding forward ends of the links 55 and 56 are apertured at 59 for the selective reception of a clutching pin 60, the outer ends of the pin 60 preferably being tapered, and the inner adjacent ends of the openings 59 being also tapered, to facilitate the selective engagement of the ends of pin 60 with the apertures, as hereinafter described. The pin 60 is arranged so as to permit a slight oscillation thereof about a horizontal axis, this arrangement best appearing in Fig. 4, showing the pin 60 as provided with transverse trunnions 61, the assembly being carried in a suitable opening 62 in the lever 44. Provision is made for biasing the pin 60 toward a substantially horizontal position, through a leaf spring 63.

It will have appeared from the preceding description of parts that as the pedal 35 is depressed or moved about its pivot 36 to the left in Fig. 3, there will result a counterclockwise movement of lever 44 about its ball pivot 46. Through engagement of the operator's foot with one of the spaced lateral projections on the pedal, and through the universal movement of the lever 44, permitted by the ball pivot 46, the lever 44 may, in addition to its counterclockwise movement, be laterally displaced within the plane of the pedal 35 so as to bring one or the other of the projecting ends of pin 60, into clutching relation with the corresponding adjacent opening 59 in one of the drag links.

The transmission as shown at Fig. 1, provides for a single reverse position of the parts, and a plurality of forward-speed positions, the transmission being shown with the driving head 15 in neutral position, and with the gear to be engaged thereby, for reversal, disposed to the right of the driving head. Those of the aligned gears, to the left (Fig. 1) of the neutral position, correspond in order, to first, second and high-speed positions of the transmission. It will thus appear that, with reference to Fig. 2, it is necessary to actuate the pin 21 to the left, bringing it successively through the positions indicated by cross marks 64, 65 and 66, corresponding respectively to the position of the center of stud 21, as the stud is first moved for control purposes, into low, intermediate and high forward speeds. The cross 67 indicates the reverse position of the center of stud 21. The intermediate points indicated by small circles, show intervening neutral or overrunning positions of the clutch and transmission assembly. When the center of stud 21 is located as defined by any of the several small circles, the motor is operatively disengaged from the driven shaft 12, to provide the presently popular free running, or overrun-clutch effect. Positioning of the stud 21 beyond the points defined by the crosses and small circles permits, through the lost motion connection between elements 22 and 30, acceleration of the motor while the transmission remains in one of its several gear-ratio positions. As a means of apprising the operator of the overrunning control or neutral positions of the pedal, any suitable means may be provided, such as a notching device (not shown) conveniently coacting with notches on the slot closer 34.

From the foregoing it appears that when it is desired to effect a control of the assembly into and through any of its several forward speeds, the clutch pin 60 will be brought into clutching engagement with the end of link 56, whereas, for reverse positions, the pin is moved into the corresponding opening of link 55. Due to the connection of links 55 and 56 at opposite sides of the pivot 51, forward or depressing movement of pedal 35 serves, through the selective connection afforded by the drag links, to obtain either a forward or backward movement of the slotted end 50 of lever 49, and hence a corresponding movement of stud 21.

It is, of course, desirable to limit the outward or upward movement of pedal 35, which may be done in any suitable manner, this provision being shown in the present example, as consisting of a stop arm 68 (Figs. 3 and 4) which may, as shown, be conveniently carried by a wall of the case 10.

Since it is also desirable that the pedal 35 be biased toward its center position in which the pin 60 is engaged with neither of the links 55 or 56, I have provided a relatively heavy leaf spring 69, extended longitudinally of and beneath the pedal 35, and having one end anchored against lateral displacement and the other end extending through a suitably slotted lug 70 carried by the body of the pedal. The necessary range of lateral movement of pedal 35 may be cared for by a pivot 71, so that the pedal element, although movable about the horizontal pivot 36, is also movable about the pivot 71, at substantially a right angle thereto.

It will have appeared from the foregoing description of parts that, although it may be desired to provide a separate, independent foot or hand throttle, nevertheless pedal 35, through the described linkage, including the cam follower 30 and cam 25, will provide during shifting, an automatic sequence of throttle movements to cause engine acceleration in a manner to relieve this operation of the personal equation. It will also appear that the outermost nose or peak of cam 25, being the one farthest to the left (Fig. 1), may be employed as shown, or otherwise desirably designed to permit of a full range of throttle movement through the pedal 35.

It will be seen that the present arrangement dispenses with any necessity for the usual manually controlled gear shift lever; that it also serves admirably the purpose of the usual clutch pedal, and that, in addition to these functions, throttle control is, or optionally may be properly coordinated with the described transmission and clutch control features, all in a manner fully to attain each of the several objects more fully outlined above.

The invention has been described by making specific reference to a presently preferred embodiment thereof, and for this reason the description is to be understood solely in an explanatory and not in a limiting sense, since numerous changes in the parts, their construction and operation may be effected, without departing from the full intendment and scope of the invention, as defined by the claims hereunto appended.

I claim:

1. In combination with a speed change transmission, a control pedal therefor adapted for movement, selectively about a horizontal axis, and about an axis normal to its own plane, an arm member in controlling relation to the transmission, a plurality of connections between said pedal and arm member, adapted, upon a given movement of said pedal, to actuate the arm member selectively in opposite directions, means, operable responsively to the movement of the pedal within its plane, for selecting the desired actuating connection, and a spring tending to keep the pedal in a neutral or inoperative position within its plane.

2. In combination with a speed change transmission, a foot control device therefor, including a pedal element adapted to be depressibly operated by movement about a horizontal axis, a pivot permitting a swingable shifting movement of the pedal element in its own plane, a transmission control arm, means for translating the depressing movement of said pedal to control the range of actuation of said arm, and means for translating the pivoted or swinging movement of said element to determine the direction of actuation of said arm.

3. In combination with an automotive transmission, a foot control device therefor, including a pedal, a transmission control arm, a pivot therefor, a pair of links connected to said arm at opposite sides of the pivot, a lever operable by the pedal, and extending between the links, a ball pivot for said lever, and link-engaging members carried laterally of the lever.

4. In a speed change transmission control, a pedal operable selectively in a plurality of vertical planes, separate speed change connections, selectively connected with the pedal, upon predetermined movement of said pedal, according to the selected plane of pedal movement, and spring means tending to bias the pedal to an inoperative position intermediate its planes of operation.

5. In an automotive control device in combination with an automotive transmission including a longitudinally movable speed change member, a control arm connected at one end, to said member, a pivot for said arm, spaced from said connection, a pair of links connected to said arm at opposite sides of the pivot, a control lever operable along a vertical plane, and between said links, a clutching connection between said lever and each of said links, the links being spaced to prevent concurrent engagement of said connections, and a spherical pivot for said lever permitting lateral displacement thereof, for selecting the desired clutching connection.

6. The combination of an automotive transmission including a longitudinally movable, speed-change member, with a control device therefor including an arm connected at one end to said member, a pivot for said arm, spaced from said connection, a pair of links connected to said arm at opposite sides of said pivot, a control lever operable in a vertical plane, a clutching connection between said lever and each of said links, a pivot for said lever permitting lateral displacement thereof for selecting the desired clutching connection, a foot pedal pivotally connected to said lever and arranged for movement, selectively, about a horizontal axis and about a second axis at a right angle to the horizontal axis, and spring means tending to bias said lever and pedal to a position in which said link connections are disengaged.

7. Automotive control apparatus including an engine throttle, a control pedal, a friction clutch, means for effecting a predetermined sequence of clutch-engaging and disengaging movements responsively to a given unidirectional movement of said pedal and coacting means for actuating the throttle alternately with respect to said clutch control movements.

8. Automotive control apparatus including a clutch, an engine throttle control member, a pedal element, connections between said element and member, adapted, upon a unidirectional pedal movement, to effect a predetermined sequence of engine-accelerating and engine-retarding movements of said throttle control member and means coacting with said pedal and connections, for actuating said clutch alternately with respect to the said throttle control member.

9. Control apparatus for an automotive vehicle provided with a speed change transmission, a friction clutch and an engine-throttle control member, said apparatus including a pedal, connections from said pedal to said clutch, transmission and throttle member, adapted to effect a coordinated sequential control thereof for forward running of the associated vehicle and alternate connections adapted to effect such coordinated control, during operation of the vehicle in reverse.

10. In an assembly including a gear type transmission and a friction clutch, a power shaft section movable axially for control purposes, spaced clutch-actuating and gear-engaging portions on said shaft section, a shifting element projecting outwardly of said shaft section, a lever connected to said shifting element, a pedal arranged for depressible, control movement, and selective connections, operable by the pedal, for translating the depressing movement of the pedal, to effect a movement of the shifting element in either direction.

11. In a power transmission of gear type, a clutch assembly, a power shaft having an axial bore, a speed control member operable in said bore, an element carried by said member adapted for interlocking engagement with the gears of the transmission, a second element, spaced from the first, and operable within the said bore in controlling association with said clutch assembly, a pedal element depressibly movable for operation of the said speed control member, a lever connected to said speed control member, a pivot for said lever, a pair of links connected to said lever at opposite sides of the pivot, and means operable by a pivoting movement of the pedal, for selectively connecting the pedal to said links.

12. An automotive control assembly including a gear type transmission and a friction clutch, a power shaft section, spaced clutch-actuating and gear-engaging portions on said shaft section, an engine throttle controlling device adapted for actuation by axial movement of said power shaft section to effect a movement of the engine throttle sequentially with the clutch-actuating placements of said section, a shifting element projecting outwardly of said shaft section, a lever connected to said shifting element, a pedal arranged for depressible control movement, a pivot for said lever, a pair of links connected to the lever at opposite sides of the pivot, each link being provided with an aperture near its free end, and pin elements operable by the pedal to engage the link apertures one at a time.

13. Automotive control apparatus including an engine throttle, a control pedal, an engine clutch, means for effecting a predetermined sequence of clutch-engaging and disengaging movements responsively to a given unidirectional movement of said pedal and coacting means operable by said pedal for actuating the throttle, the last means including elements coacting to establish a timed relation between certain of the throttle movements and the clutch control movements.

EUGENE S. BUSH.